United States Patent
Wang et al.

[11] Patent Number: 5,393,582
[45] Date of Patent: Feb. 28, 1995

[54] ENHANCED CRUSH STRENGTH CONSTRUCTION MULTI-GRADE PAPERBOARD TUBES

[75] Inventors: Yiming Wang; Monica McCarthy; Terry D. Gerhardt, all of Madison, Wis.; Charles G. Johnson, Hartsville, S.C.

[73] Assignee: Sonoco Products Company, Hartsville, S.C.

[21] Appl. No.: 71,485

[22] Filed: Jun. 4, 1993

[51] Int. Cl.$^6$ ............................................. F16L 9/16
[52] U.S. Cl. ......................... 428/34.2; 428/36.91; 428/37; 428/218; 428/537.5; 242/118.32; 138/144; 138/140
[58] Field of Search ............... 138/144, 150, 154, 140; 493/299, 303; 428/34.2, 36.9, 36.91, 37, 218, 537.5; 242/609.4, 610.1, 118.32, 118.8

[56] References Cited

U.S. PATENT DOCUMENTS

| | | | |
|---|---|---|---|
| Re. 33,060 | 9/1989 | Cunningham et al. | 242/118.31 |
| 726,894 | 5/1903 | Ferres | 138/144 |
| 1,519,694 | 7/1921 | Muessman | 138/150 |
| 2,751,936 | 6/1956 | Dunlap et al. | 138/150 |
| 2,755,821 | 7/1956 | Stahl | 138/144 |
| 2,943,540 | 7/1960 | McBain | 138/150 |
| 3,037,529 | 6/1962 | Hancik | 138/144 |
| 3,194,275 | 7/1965 | Biggs, Jr. et al. | 138/144 |
| 3,300,159 | 1/1967 | Johnson et al. | 242/118.32 |
| 3,548,883 | 12/1970 | Cohen | 138/144 |
| 3,587,656 | 6/1971 | Cunningham | 138/144 |
| 3,783,908 | 1/1974 | Stump et al. | 138/144 |
| 4,645,553 | 2/1987 | Languillat | 138/144 |
| 4,792,326 | 12/1988 | Tews | 138/144 |
| 5,167,994 | 12/1992 | Paulson | 428/34.2 |

Primary Examiner—Ellis P. Robinson
Assistant Examiner—Rena L. Dye
Attorney, Agent, or Firm—Bell, Seltzer, Park & Gibson

[57] ABSTRACT

The invention provides multi-grade spirally wound paperboard tubes of enhanced flat crush strength construction. The multi-grade spirally wound paperboard tubes of the invention include a plurality of structural paperboard plies having at least two predetermined densities including a lower density and a higher density wherein the higher density is at least about 3% greater than the lower density. The cylindrical bodywall is defined in radial cross section by at least one centrally located paperboard layer disposed between at least one radially inwardly located structural paperboard layer and at least one radially outwardly located structural paperboard layer. The centrally located paperboard layer is formed from the higher density paperboard and the inwardly and outwardly located structural paperboard layers are formed from lower density paperboard.

22 Claims, 4 Drawing Sheets

ENHANCED CRUSH STRENGTH CONSTRUCTION MULTI-GRADE PAPERBOARD TUBES

FIELD OF THE INVENTION

The invention is directed to multi-grade paperboard tubes of enhanced crush strength construction. More specifically the invention is directed to multi-grade multiple ply paperboard tubes having the plies positioned within the wall of the tube at locations for enhancement of flat crush strength.

BACKGROUND OF THE INVENTION

Paperboard tubes are widely used in the paper, film and textile industries to wind material as it is manufactured. These tubes are manufactured continuously by spirally winding multiple paperboard strips or plies around a stationary mandrel. Paperboard tubes are also made in a convolute winding process by forming a multiple layer wrap of a wide paperboard sheet around a stationary mandrel. Although paperboard is relatively weak on a single layer basis, a tube constructed from multiple spirally wound or convolute wound paperboard layers can attain substantial strength.

As with other materials, paperboard tubes exhibit different strength values depending on which strength characteristics are measured. These different strength characteristics, such as compressive strength, tensile strength, beam strength, etc., can vary according to tube construction. The standard industry test to evaluate strength of paper tubes is the flat crush test. This test involves compressing a tube along its sides by placing the tube between two flat plates. One plate is stationary while the other moves at a constant displacement rate transversely to the axis of the tube. The flat crush strength is the maximum load obtained during the test.

Paperboard is an orthotopic material. Thus, paperboard properties are different in the machine direction (MD) and in the cross machine direction (CD), wherein machine direction refers to the paper manufacturing process. The property difference between the MD and CD can be attributed to the tendency for more paper fibers to be aligned along the MD as compared to CD. The orthotopic properties of paper influence tube strength and complicate any accurate prediction of tube strength.

In addition, the paperboard strips used to prepare spirally wound paperboard tubes are wound at varying angles, and tube properties depend, at least in part, on the general angle of the spirally wound strips. This in turn, increases the difficulty in accurately predicting paperboard tube properties from theoretical principals. Recently, a closed-form elasticity solution has been developed to predict stresses and strains in spiral paper tubes loaded axisymmetrically. In experiments to verify this theory, a load was applied via fluid to the exterior periphery of a spirally wound paperboard tube so that the radial load was uniform around the circumference of the tube; see T. D. Gerhardt, "External Pressure Loading of Spiral Paper Tubes: Theory and Experiment", Journal of Engineering Materials and Technology, Vol. 112, pp. 144–150, 1990. As opposed to the situation analyzed in the 1990 study, flat crush loading is not uniform around the tube circumference. Therefore, flat crush stress distributions are much more complex than those resulting from the radial crush loading of the 1990 article.

It is generally understood that flat crush strength can be increased by increasing tube wall thickness and/or employing stronger paper plies for the layers of the spirally wound tube. In regard to the latter, paper is available in a wide variety of grades. In general, paper strength can be improved by mechanical refining of paperboard pulps. Thus, a well-beaten pulp generally produces a stronger grade of paper compared to a lightly beaten pulp. In addition, paper strength can be improved by compressing the paperboard during manufacture by running the web through a set of high pressure nip rolls. Further, paperboard strength is influenced by fiber type and quality. As a general rule, stronger paperboard sheets have a higher density than low strength paperboard sheets. Stated differently, the above treatments generally result in an increase in paperboard density along with the increase in paperboard strength. The higher density, higher strength papers are also more costly.

It is common in the paper tube industry to use more than one type of paperboard when fabricating a tube. This can be done for many reasons. For example, in some cases, a special surface finish is needed on the tube inside diameter (ID) or on the tube outside diameter (OD) and a paper ply having such a finish is therefore used on the OD or ID. Different grades of paper are also used in order to satisfy other special property requirements for the tube ID or OD such as, for example, as might be required for interaction with a chuck or other structure. At times, different paper grades are used simply to satisfy a wall thickness requirement or to reduce cost by using cheaper, lower strength paperboard in the tube and/or to compensate for lack of inventory of a certain ply width of paper.

Although multiple grades of paper have previously been used to produce spirally wound paperboard tubes, the multiple grades of paperboard have not in the past, to the knowledge of the present inventors, been positioned with the intent and effect of providing maximum flat crush strength. Moreover, such positioning is a relatively complex problem for the reasons discussed above; namely, that a paper tube is a complex, anisotropic structure. Moreover, the number of different possible ply position combinations for a multiple grade (multi-grade) paperboard tube is staggering even when a relatively few number of plies are used. Various assumptions have been relied on in the past in positioning different plies in paperboard tubes, and it is the inventors' understanding that a widely held view has been that flat crush strength can be enhanced by positioning high density paperboard plies on the exterior of the paperboard tube. Although various approaches have been used in the art in an attempt to use higher strength plies to improve flat crush strength of paperboard tubes, there is no known criteria according to which paperboard ply placement in a paperboard tube can be carried out to maximize flat crush strength with reliability.

SUMMARY OF THE INVENTION

The invention provides multi-grade paperboard tubes of enhanced flat crush strength construction. The multi-grade paperboard tube constructions of the invention can provide substantial savings in the manufacture of paperboard tubes by allowing use of multiple plies of low cost, low density paperboard with only minimal decrease in flat crush strength. Alternatively, the multi-grade paperboard tube constructions of the invention can provide significant increases in flat crush strength while minimizing the use of more expensive, high density paperboard plies.

The multi-grade paperboard tubes of the invention comprise a cylindrical bodywall formed of a plurality of structural paperboard plies. The cylindrical bodywall is defined in radial cross section by at least one centrally located paperboard ply disposed between at least one radially inwardly located structural paperboard ply and at least one radially outwardly located structural paperboard ply. The centrally located paperboard layer is formed from a higher density paperboard having a density at least about 3% greater than each of the inwardly and outwardly located structural paperboard plies. Preferably, the multi-grade paperboard tubes of the invention include at least five individual plies, of which at least two are centrally located higher density paperboard plies. The centrally located paperboard ply or plies are positioned, according to preferred embodiments of the invention, at the center of the wall of the paperboard tube or offset radially inwardly within the tube wall. The multi-grade paperboard tubes of the invention can be formed by a convolute winding or spiral winding process and are preferably spiral wound tubes.

In accordance with the invention, it has been found that in multiple ply paperboard tubes, in some instances, up to one-third of the plies can be constructed of low density paperboard plies while providing tubes having a flat crush strength nearby the same as tubes having the same number plies and being constructed from all high density paperboard plies. Conversely, it has been found that even when only a small percentage of plies in a multiple ply paperboard tube are high density plies, proper placement of the plies can provide a significant improvement in tube strength. Moreover, it has been found that placement of high density plies according to the prior art technique of positioning the high density plies as the outside layers of the tube, actually results in poor use of the strength properties of the plies for improving the flat crush strength of the tubes.

In various advantageous embodiments of the invention, between about 15% and 85% of the plies in the multiple ply spirally wound tubes of the invention, are high density, high strength plies. More advantageously, between about 30% and about 70% of the plies are high strength plies. It is also preferred that the difference in density between the high density and low density plies be at least about 5%. Moreover, density differences of 10% or greater can be used in accordance with the invention to improve cost optimization for the tube structure while improving strength when the multi-grade construction of the invention is employed. The invention also provides multi-grade paperboard tubes employing paperboard plies of three or more densities. In such an arrangement the intermediate density paperboard plies are preferably divided into two groups of contiguous plies. One group of intermediate density plies is positioned between the radially inward plies and the central high density paperboard plies. The other group of intermediate density plies is positioned between the central high density plies and the radially outward low density plies.

The paperboard tube construction of the invention can be used with a wide range of paper grades and with any number of plies of each grade. In each instance, construction of the multi-grade, multi-layer paperboard tube according to the invention can provide convolute and spirally wound tubes with optimum flat crush strength.

BRIEF DESCRIPTION OF THE DRAWINGS

In the drawings which form a portion of the original disclosure of the invention.

DETAILED DESCRIPTION OF THE INVENTION

In the following detailed description of the invention, the preferred embodiments of the invention are described in order to enable practice thereof. It will be apparent that various terms are used in order to describe the invention and not for purposes of limitation. It will also be apparent that the invention is susceptible to numerous changes and variations as will become apparent from a consideration of the invention as shown in the attached drawings and described below.

Figure 1:
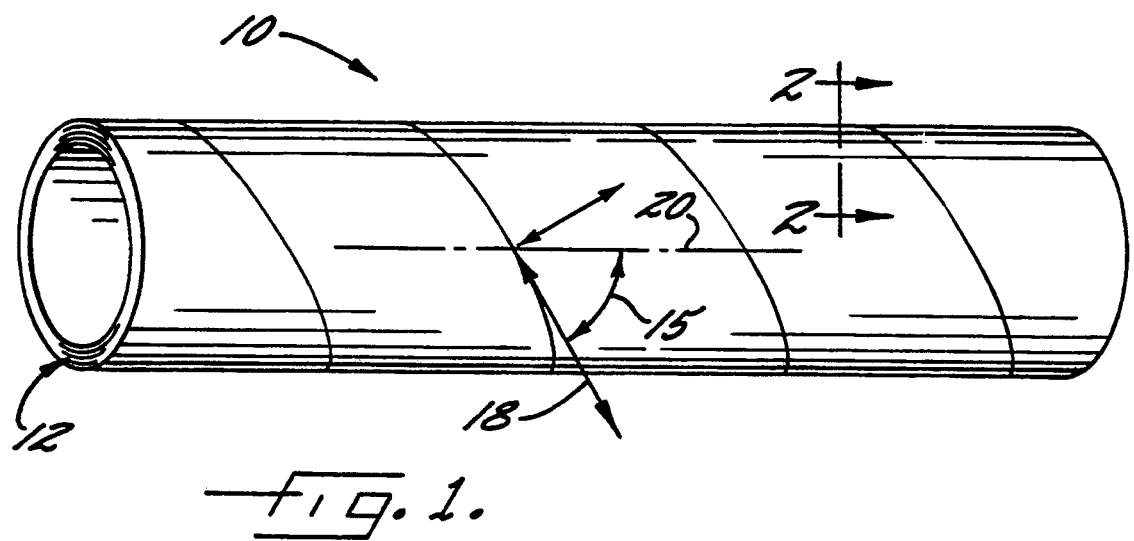
FIG. 1 is a perspective view of a multi-grade spirally wound paperboard tube in accordance with the invention.

FIG. 1 illustrates a spirally wound multi-grade paperboard tube 10 formed of a cylindrical bodywall 12. The cylindrical bodywall is formed of a plurality of plies which are wound at an angle 15 which is determined by expressing the direction of wind 18 of the paper plies relative to the axis 20 of the tube. Typically, paperboard tubes are wound at angles of between about 50 degrees and about 70 degrees depending on the tube diameter. For example, tubes with an inside diameter of 3 in. are typically wound at wind angles between about 56 degrees and about 65 degrees.

Figure 2:
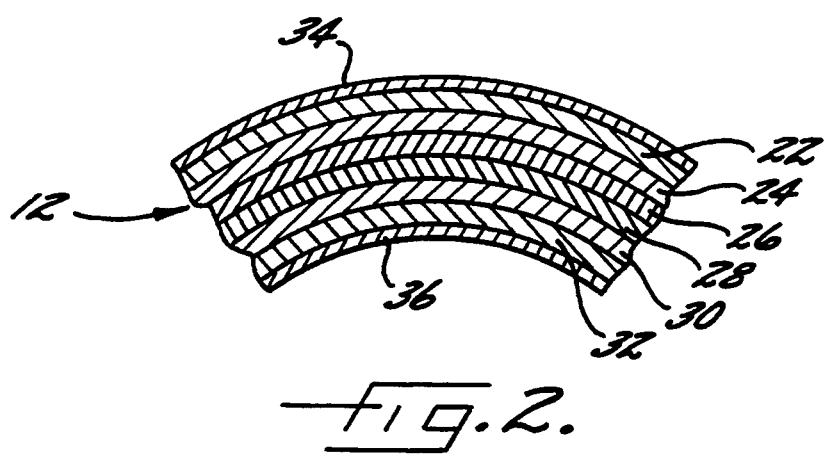
FIG. 2 is a greatly enlarged partial cross-sectional view taken along line 2—2 of FIG. 1 illustrating the paperboard layers in the multi-grade spirally wound paperboard tube of FIG. 1.

FIG. 2 illustrates one preferred bodywall construction for bodywall 12 of the spirally wound tube illustrated in FIG. 1. In the bodywall construction illustrated in FIG. 2, there are 6 structural paperboard layers, 22, 24, 26, 28, 30 and 32. In addition, the bodywall illustrated in FIG. 2 includes an exterior layer 34 and an interior layer 36.

As illustrated in FIG. 2, exterior layer 34 and interior layer 36 are shown to be thin paperboard layers incorporated into the paperboard bodywall for non-structural purposes. As will be apparent to those skilled in the art, such non-structural layers can be formed of paperboard or non-paperboard materials including foils, films, impregnated paper layers, and the like. Thus, as indicated previously, exterior and interior layers 34 and 36, respectively, can be provided for non-structural purposes including provision of a special surface finish, a gripping surface, a coloring layer or the like. For the purposes of the present invention, such exterior layers and interior layers which are provided for specific functions other than wall strength and thickness functions are considered to be non-structural layers. However, those skilled in the art will recognize that a structural layer can include a surface treatment in order to provide a desired finish, color, or the like to the exterior or interior of the tube surface. In such instances, wherein the paperboard layer is constructed and arranged for contributing both to (1) surface characteristics such as finish, color, hardness or the like; and (2) wall strength and/or thickness; such a layer is considered to be a structural layer.

The structural plies illustrated in FIG. 2, i.e., plies 22, 24, 26, 28, 30 and 32, are positioned to optimize flat crush strength. Paperboard plies 26 and 28 are positioned in a central portion of the tube wall 12. These centrally positioned paperboard plies are formed from high density paperboard materials. It will also be seen that the central high density paperboard plies 26 and 28 are positioned between two radially outwardly located structural plies, plies 24 and 22, and two radially inwardly located paperboard plies, plies 30 and 32. The radially inwardly located plies, 30 and 32, and also the radially outwardly located plies, plies 24 and 22, are formed from paperboard having a density lower than that of the high density paperboard used to form plies 26 and 28. The lower density plies 30, 32 and 24, 22 can have the same or different densities, but are each lower than the density of the central plies, as discussed below.

Paperboard densities are determined for the purposes of the subject invention in accordance with the Tappi 220 and 411 standard tests. According to these tests, the paperboard is fully conditioned at $73°\pm1°$ F. and at $50\%\pm2\%$ relative humidity until it reaches equilibrium. Thereafter, at least 5 samples from the paperboard are measured for thickness, and area and are weighed. Density is then determined by dividing the weight in grams by the volume in cubic centimeters.

Paperboard strips or plies of a widely varying range of densities and thicknesses are used to form paperboard tubes as is well known in the art. The present invention can employ paperboard plies having thicknesses and densities throughout the ranges of thickness and density conventionally used in the art. Typically such densities range from about 0.50 to about 0.90 g/cm$^3$, more typically from about 0.55 to about 0.85 g/cm$^3$. As discussed previously, paperboard strength and density are typically varied by varying pulp treatments, degree of nip compression and raw materials, and can also be changed by employing various known additives and strengthening agents during the paper making process. Paperboard plies conventionally used in forming tubes and useful herein typically have a thickness within the range of between about 0.003 in. and about 0.050 in., more typically between about 0.012 in. and about 0.040 in.

As indicated previously, the paperboard plies of higher and lower density, advantageously have a density difference of at least about 3%. This difference is determined by subtracting the density of the lower density paperboard ply from the density of the higher density paperboard ply and expressing the difference as a function of the density of the lower density paperboard ply. Advantageously, the higher density paperboard plies have a density at least about 3% greater than the lower density paperboard plies and more advantageously at least about 5% greater than the low density plies.

Figure 3:
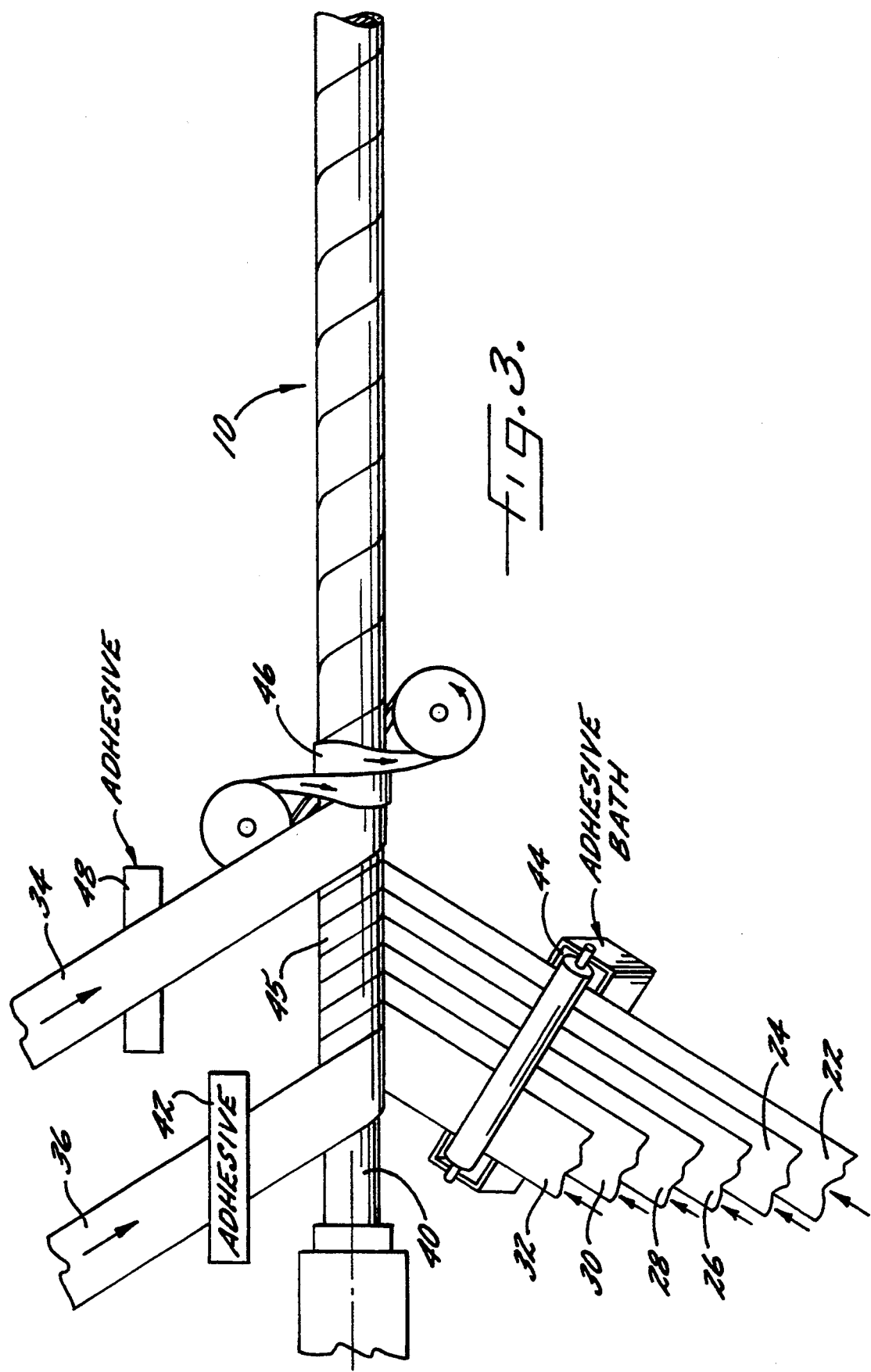
FIG. 3 schematically illustrates the process for manufacturing paperboard tubes according to one preferred embodiment of the invention.

FIG. 3 schematically illustrates one preferred process of forming multi-grade paperboard tubes in accordance with the invention. In FIG. 3, the innermost non-structural paperboard ply 36 is supplied from a source (not shown) for wrapping around a stationary mandrel 40. Prior to contacting the mandrel 40, the paperboard ply 36 is treated on its exterior face with a conventional adhesive from an adhesive supply 42. The next paperboard ply layer 32 is thereafter wound onto layer 36. Layer 32, which is the innermost structural paperboard layer is formed of a lower density paperboard material as described previously. This layer is typically treated on both exterior and interior faces by immersion in an adhesive bath 44, or by a roller coating, or a metering adhesive coating process as is known in the art. Thereafter, paperboard layers 30, 28, 26, 24 and 22, respectively are wound in overlapping relation onto the first two layers in order to build up the structure of the paperboard wall. As with layer 32, each of plies 30, 28, 26, 24 and 22 are immersed in an adhesive bath 44 or are otherwise coated with adhesive prior to winding onto the mandrel 40. As discussed previously with respect to FIG. 2, it will be apparent that plies 28 and 26 are high density paperboard plies while plies 32, 30, 24 and 22 are lower density paperboard plies. It will also be apparent that the higher density paperboard plies, 28 and 26 will form contiguous paperboard layers positioned centrally within the tube wall between the radially interior low density contiguous paperboard layers formed from plies 32 and 30, and the radially exterior contiguous paperboard layers formed from plies 24 and 22.

A rotating belt, 46, which is driven by means not shown, rotates the entire multiple layered structure 45, thereby causing the structure to move to the right on mandrel 40. Thereafter, a non-structural ply 34 may be applied to the outside of the partially formed tube 45 to thereby form the completed tube structure 10 illustrated in FIG. 1. Prior to contacting the partially formed tube structure 45, nonstructural paperboard ply 34 is coated on its bottom face by adhesive supply 48 with an adhesive material. The exterior face of nonstructural ply 34 contributes a predetermined surface finish or appearance to the outside of the thus formed continuous tube 10.

The continuous tube 10 is moved to the right down the mandrel 40 and is thereafter cut into individual tube lengths by a rotating saw or blade, (not shown), as will be apparent to those skilled in the art. Typically, the tube length will be chosen depending on the desired end use for the paperboard tube. For example, where the paperboard tube is intended for use as a textile core, the tube length will normally be within the range of between about 6 in. and about 20 in. Where the paperboard tube is to be used as a core for supporting paper, such as newsprint, the tube will normally have a length of between about 40 in. and about 125 in. Where the paperboard tube is intended for use as a support for a film or foil material, the length will typically be within the range of between about 4 in. and about 200 in.

As is well known in the art, the process illustrated in FIG. 3 is subject to many changes. Thus, the system can include several belts 46. Similarly the plies can all be fed from the same side of the mandrel. Moreover, the plies can be fed on top of or beneath the mandrel as desired.

The tubes and the tube forming process illustrated in FIGS. 1-3 are spiral wound tubes and processes. However, the invention is also applicable to convolute wound tubes. In such case, a single sheet of paperboard can be wound a plurality of turns at 90 degrees on a mandrel to form one or a plurality of contiguous layers or plies of the same density. Thereafter a second paperboard sheet of a higher density is used to form one or a plurality of layers, i.e., plies, of a higher density radially outwardly on top of the first ply or groups of plies. Then, a third paperboard sheet of density lower than the second sheet is used to form a ply or a group of plies radially outwardly on top of the ply or plies formed from the second sheet.

Figure 4:
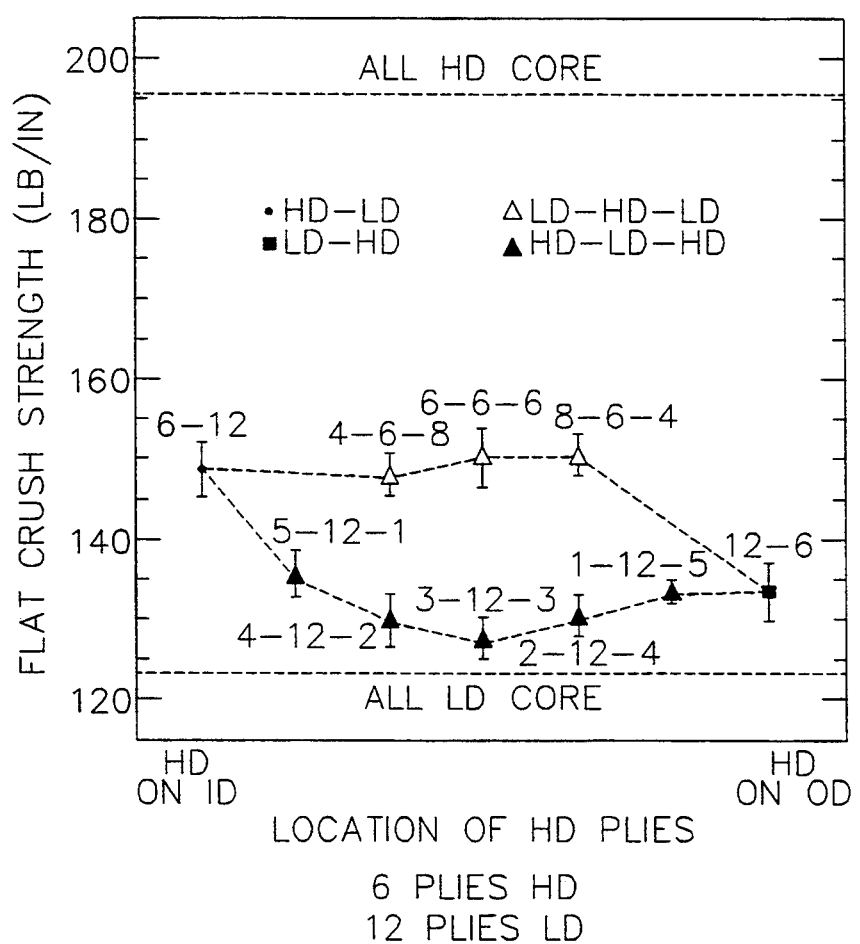
FIGS. 4 and 5 graphically illustrate flat crush strength for 18 layer multi-grade paperboard tubes having six high density plies and nine high density plies respectively, and wherein the high density plies are provided in differing locations throughout the tube wall in each instance.
Figure 5:
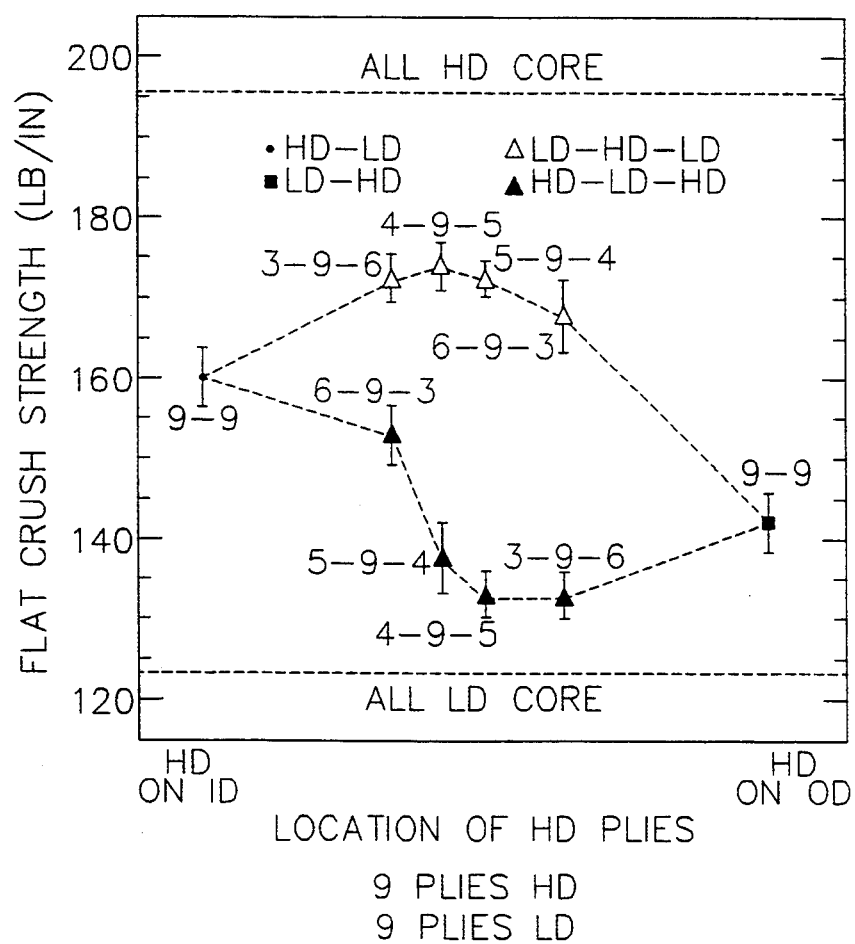

FIGS. 4 and 5 illustrate graphically the results of a series of experimental paper tube constructions and the flat crush strengths thereof. The tests illustrated in FIGS. 4 and 5 involved construction of paper tubes with 3 inch inside diameters using, in each case, 18 plies of paperboard. Two different types of paperboard, labeled, "LD" and "HD" were used. These had the same nominal thickness of 0.025 in. The density of the HD plies was 0.75 g/cm$^3$. The density of the LD paper plies was 0.68 g/cm$^3$. Thus, the HD ply had a density 10% greater than that of the LD ply.

The data illustrated in FIGS. 4 and 5 are based on 32 different tube constructions, each of which had 18 plies as discussed previously. One tube was made with all HD paperboard plies. One tube was made with all LD paperboard plies. Ten tubes were made using six plies of HD paperboard and 12 plies of LD paperboard. The positioning of the LD and HD paperboard layers were varied among these 10 tubes as discussed below in connection with FIG. 4. Another set of 10 tubes was made using 9 HD paperboard layers and 9 LD paperboard layers. The positioning of the HD and LD paperboard layers was varied as discussed in connection with FIG. 5.

Each of the tubes were tested to determine flat crush strength according to the test standard: CCTI T 108, "Side-to-Side Crush", Composite Can and Tube Institute, Suite T-10, Washington, D.C. (1987). In accordance with this test, all tubes were fully conditioned before testing at 50% Relative Humidity and 73° F. for a period of 2 weeks. The tubes were placed between two flat platens and compressed along their sides as one of the two flat platens moved at a constant rate of 2.5 in/min. The load was continuously recorded. The reported "Flat Crush Strength" was the maximum load obtained during the test. Twelve replications were made for each tube and the error bars shown in the figures represent one standard deviation.

FIG. 4 graphically illustrates the data obtained from the 10 different tube constructions, each containing six plies of HD paperboard and 12 plies of LD paperboard. The dotted line at the bottom of the graph is the flat crush strength of a tube having all LD plies. The dotted line at the top of the graph is the flat crush strength of a tube having all HD plies. The solid circle on the left is the tube with all plies of HD paper grade on the inside of the core; thus, the tube had the wall construction of six plies HD paperboard/12 plies LD paperboard in the radially outward direction. The solid square on the right is the tube with all plies of HD paper grade on the outside of the tube. Thus, this tube had the ply construction of 12-6 (LD/HD), again, beginning with the inside of the tube and moving outwardly. The open triangle data are constructions of LD-HD-LD; thus, in these cases all HD plies were contiguous and centrally located within the tube wall. The exact positioning of the central HD plies varied from closer to the innermost layer in the 4-6-8 structure, to closer to the outermost layer in the 8-6-4 structure, to the center of the wall in the 6-6-6 structure.

The solid triangle data in FIG. 4 are for tube constructions of HD-LD-HD; thus, in these cases, all 12 LD plies were contiguous and centrally located within the tube walls. The exact positioning of the contiguous LD plies varied from closer to the inner most layer in the 1-12-5 structure, and closer to the outermost layer in the 5-12-1 structure. In the 3-12-3 structure, it will be apparent that the low density layers were contiguous and centrally located at the center of the tube wall.

The flat crush strength data from the different tube constructions illustrated in FIG. 4 shows the highest wall strength for the tube construction wherein the 6 high density paperboard plies were contiguous and at the center of the wall structure (the 6-6-6 structure). The lowest wall strength was for the HD-LD-HD structure of the configuration 3-12-3, i.e. 3 HD plies, 12 LD plies and 3 HD plies moving from the inner to outer tube wall. It is noteworthy that the strength of the highest strength tube, the 6-6-6 (LD-HD-LD) tube is 18% higher than the worst structure. It is also noteworthy that the 12-6 (LD-HD) structure, wherein all of the high density plies constituted the outer layers of the tube wall, was actually significantly less strong than the 6-12 (HD-LD) structure wherein the high density plies were the innermost plies of the tube structure. This in direct contradiction to the previously mentioned understanding that high density, high strength plies should be provided on the exterior of the tube to maximize strength.

FIG. 5 illustrates varying constructions of paperboard tubes, each having 9 high density plies and 9 low density plies. The information is presented in FIG. 5 in the same manner as in FIG. 4. As with the previous tubes, it will be seen that the lowest strength tube is that having the low density plies grouped contiguously together in the middle of the tube wall. The tube with the highest strength is that having the 9 high density plies arranged centrally within the tube wall, slightly towards the inside wall surface; that is, the 4-9-5 (LD-HD-LD) tube structure. All of the tube structures having the 9 high density plies contiguously arranged and centrally located within the tube walls had relatively high flat crush strengths. It is noteworthy that the highest crush strength construction exhibited a crush strength 31% higher than the worst construction.

Also in FIG. 5, it will be seen that the highest crush strength tube construction had a crush strength greater than the crush strength of the tube of 18 low density plies in an amount much more than half of the difference between the crush strength of the 18 low density ply tube and the crush strength of the 18 high density ply tube. Thus, even though the tubes of FIG. 5 are one-half high density plies and one-half low density plies, the highest strength construction has a crush strength much closer to the all high density ply tube. Finally, it is also noteworthy that the tube having the high density plies as the outer layers had a low crush strength value.

The invention is useful in connection with paperboard tubes having a wide ranging number of layers from, for example, about 5 plies or layers up to 30-35 plies or layers and higher. In preferred embodiments of the invention, between about 15% and about 85% of the plies are higher density paperboard plies. The exact ratio of high density and low density plies can be varied depending on tube wall thickness and strength requirements. For high strength tubes, it is preferred that between about 30 and about 70% of the plies are high density plies, and the contribution of these plies to tube strength is most apparent when at least about 50% of the plies are higher density plies.

The improved tube constructions of the invention can be used to provide tubes for various end uses. It will be apparent that the invention is particularly important for those end uses where flat crush strength is an important consideration. These end uses include tubes for papermill cores having wall thicknesses ranging from about 0.300 in. to about 0.900 in. and lengths ranging from about 40 in. to about 125 in.; tubes constructed for film cores having wall thicknesses of 0.150 in. to 0.700 in. and lengths of from 10 in. to 200 in. and tubes for textile cores.

As indicated previously, the invention offers the potential for significant cost savings, particularly when a plurality of paperboard plies in excess of about 10, preferably about 15 or more, are used in the construction of the paperboard core. In such instances, the manufacturer has the potential to substitute a plurality of low density paperboard layers for what normally would be more costly high density paperboard layers, thereby effecting a substantial savings in costs.

The invention is susceptible to numerous changes and variations. For example, the invention has been described in connection with the use of paperboard plies having two different densities. However, the invention can also be used with paperboard plies of three or more densities. In such instances, the intermediate density paperboard plies are preferably positioned adjacent the central, high density paperboard plies on both sides thereof. Thus, the intermediate density paperboard plies are preferably divided into substantially equal portions. One portion is used to provide contiguous intermediate density layers between the central high density paperboard plies and the radial outward low density plies. The other intermediate density plies are preferably positioned contiguously between the central high density paperboard plies and the radially inwardly located paperboard plies.

It will also be apparent that this invention can provide substantial benefits for enhancing flat crush strength even when the construction yielding an absolute maximum flat crush strength is not used. Thus for example, several higher density paperboard plies can be positioned centrally within the tube wall, positioned closely adjacent each other radially, but can include one or more low density layers distributed therein, i.e., between a pair or pairs of the high density plies, without loss of the benefits of the invention. Moreover, non-paperboard plies can be included within the tube wall also. Similarly, the use of exterior and interior high density paperboard layers can be employed within the teachings of this invention so long as other higher density layers of the tube wall are positioned centrally for increasing the flat crush strength of the tube. In such cases, however, it is preferred that at least a majority or more of the high density plies are centrally located.

The invention has been described in considerable detail with reference to its preferred embodiments. However, variations and modifications can be made without departure from the spirit and scope of the invention as described in the foregoing detailed specification and defined in the appended claims.

That which is claimed is:

1. A multi-grade paperboard tube of enhanced flat crush strength construction comprising:

a cylindrical bodywall formed from a plurality of structural paperboard plies and being defined in radial cross section by at least one centrally located paperboard ply disposed between at least one radially inwardly located structural paperboard ply and at least one radially outwardly located structural paperboard ply;

wherein the centrally located paperboard ply is formed from a higher density paperboard having a density that is at least about 3% greater than the density of the paperboard forming either of the inwardly and outwardly located structural paperboard plies to thereby enhance the flat crush strength of the multi-grade paperboard tube and wherein between about 15% and 85% of the plies in the paperboard are formed of the higher density paperboard.

2. The multi-grade paperboard tube of claim 1 comprising at least 5 structural paperboard plies including at least two contiguous centrally located plies formed from said higher density paperboard.

3. The multi-grade paperboard tube of claim 2 wherein said tube is a spirally wound paperboard tube.

4. The multi-grade paperboard tube of claim 1 wherein the centrally located paperboard ply of higher density is offset radially inwardly within the tube wall.

5. The multi-grade paperboard tube of claim 2 wherein said contiguous centrally located high density paperboard plies are offset radially inwardly within the tube wall.

6. The multi-grade paperboard tube of claim 5 comprising at least 10 structural paperboard plies.

7. The multi-grade paperboard tube of claim 1 wherein between about 30% and about 70% of the paperboard plies are formed of the higher density paperboard plies.

8. The multi-grade paperboard tube of claim 7 comprising at least 15 paperboard plies.

9. The multi-grade paperboard tube of claim 8 wherein said higher density paperboard plies have a density at least about 5% greater than the density of either of the inwardly and outwardly located structural paperboard plies.

10. The multi-grade paperboard tube of claim 1 additionally comprising at least one non-structural ply of paperboard or other material disposed on the exterior surface or the interior surface of the paperboard tube.

11. The multi-grade paperboard tube of claim 1 wherein said tube is a convolutely wound tube.

12. The multi-grade paperboard tube of claim 1 comprising at least 5 structural paperboard layers including a plurality of centrally located plies formed of said higher density paperboard, said centrally located plurality of plies being located radially closely adjacent each other and said multi-grade paperboard tube additionally comprising at least one paperboard ply having a density at least 3% lower than said higher density paperboard ply and being positioned between at least two of said higher density plies.

13. A multi-grade spirally wound paperboard tube of enhanced flat crush strength construction comprising:

a cylindrical bodywall having a plurality of structural paperboard plies formed from paperboard of at least two predetermined densities comprising a first density and a higher second density that is at least 3% greater than the first density, said cylindrical bodywall being defined in radial cross section by a plurality of contiguous, centrally located paperboard plies formed from the higher second density paperboard, said centrally located plies being disposed between at least one inwardly located structural paperboard ply and at least one outwardly located structural paperboard ply, each of said inwardly and outwardly located paperboard plies being formed from said first density paperboard or paperboard of a density lower than said first density, and wherein between about 15 and 85% of the paperboard plies in the paperboard tube are formed from said higher second density paperboard plies.

14. The multi-grade spirally wound paperboard tube of claim 13 comprising at least two contiguous paperboard plies each of which are formed from paperboard having a density less than or equal to said first density.

15. The multi-grade spirally wound paperboard tube of claim 14 wherein said contiguous paperboard plies formed from said paperboard of density less than or equal to said first density, are located radially outwardly of said centrally located paperboard plies.

16. The multi-grade spirally wound paperboard tube of claim 13 wherein there are a plurality of contiguous paperboard plies formed from paperboard of density less than or equal to said first density, located radially inwardly of said centrally located paperboard layers.

17. The multi-grade spirally wound paperboard tube of claim 14 comprising at least 10 structural paperboard layers.

18. The multi-grade spirally wound paperboard tube of claim 14 wherein between about 30% and about 70% of the paperboard plies are formed from said higher second density paperboard plies.

19. The multi-grade spirally wound paperboard tube of claim 18 comprising at least 15 paperboard plies.

20. The multi-grade spirally wound paperboard tube of claim 19 wherein said higher second density paperboard plies have a density at least about 5% greater than the first density.

21. The multi-grade spirally wound paperboard tube of claim 14 additionally comprising at least one non-structural ply formed of paperboard or another material disposed on the exterior surface or the interior surface of the paperboard tube.

22. The multi-grade paperboard tube of claim 13 comprising at least 5 structural paperboard layers including a plurality of centrally located plies formed of said higher second density paperboard, said centrally located plurality of plies being located radially closely adjacent each other and additionally comprising at least one paperboard ply of a density less than or equal to said first density between at least two of said higher second density plies.

* * * * *

UNITED STATES PATENT AND TRADEMARK OFFICE
CERTIFICATE OF CORRECTION

PATENT NO. : 5,393,582

DATED : February 28, 1995

INVENTOR(S) : Yiming Wang, et al.

It is certified that error appears in the above-identified patent and that said Letters Patent is hereby corrected as shown below:

On the title page item [56] References, U.S. patents,

"7/1921" should read --12/1924--.

Signed and Sealed this

Twenty-fifth Day of April, 1995

Attest:

BRUCE LEHMAN

*Attesting Officer*     *Commissioner of Patents and Trademarks*